INVENTORS
EARLE E. ELDREDGE
DAVID B. JORDAN
BY Michael Hertz
ATTORNEY

Dec. 23, 1958

E. E. ELDREDGE ET AL 2,865,994

TELETYPEWRITER CODE DECODER

Filed Feb. 9, 1955

4 Sheets-Sheet 2

INVENTORS
EARLE E. ELDREDGE
DAVID B. JORDAN
BY
Michael Hertz
ATTORNEY

Dec. 23, 1958

E. E. ELDREDGE ET AL 2,865,994

TELETYPEWRITER CODE DECODER

Filed Feb. 9, 1955

4 Sheets-Sheet 3

Fig. 5

| | BAUDOT CODE | | | | | | |
|---|---|---|---|---|---|---|---|
| RELAY | 1 | 2 | 3 | 4 | 5 | CHARACTER | SEXTUPLE CODE |
| | X | X | 0 | X | 0 | J | 11 |
| | X | X | X | X | 0 | K | 12 |
| | X | X | 0 | 0 | X | W | 13 |
| | X | X | X | 0 | X | Q | 14 |
| | X | X | 0 | X | X | FIG. | 15 |
| | X | X | X | X | X | LET. | 16 |
| | 0 | X | 0 | X | 0 | R | 21 |
| | 0 | X | X | X | 0 | C | 22 |
| | 0 | X | 0 | 0 | X | L | 23 |
| | 0 | X | X | 0 | X | P | 24 |
| | 0 | X | 0 | X | X | G | 25 |
| | 0 | X | X | X | X | V | 26 |
| | 0 | 0 | 0 | X | 0 | CR | 31 |
| | 0 | 0 | X | X | 0 | N | 32 |
| | 0 | 0 | 0 | 0 | X | T | 33 |
| | 0 | 0 | X | 0 | X | H | 34 |
| | 0 | 0 | 0 | X | X | O | 35 |
| | 0 | 0 | X | X | X | M | 36 |
| | X | 0 | 0 | X | 0 | D | 41 |
| | X | 0 | X | X | 0 | F | 42 |
| | X | 0 | 0 | 0 | X | Z | 43 |
| | X | 0 | X | 0 | X | Y | 44 |
| | X | 0 | 0 | X | X | B | 45 |
| | X | 0 | X | X | X | X | 46 |
| | 0 | 0 | 0 | 0 | 0 | BLANK | 51 |
| | 0 | 0 | X | 0 | 0 | SPACE | 52 |
| | 0 | X | 0 | 0 | 0 | LF | 53 |
| | 0 | X | X | 0 | 0 | I | 54 |
| | X | 0 | 0 | 0 | 0 | E | 61 |
| | X | 0 | X | 0 | 0 | S | 62 |
| | X | X | 0 | 0 | 0 | A | 63 |
| | X | X | X | 0 | 0 | U | 64 |

X = CLOSED
0 = OPEN

INVENTORS
EARLE E. ELDREDGE
DAVID B. JORDAN
BY Michael Herz
ATTORNEY

United States Patent Office 2,865,994

Patented Dec. 23, 1958

2,865,994

TELETYPEWRITER CODE DECODER

Earle E. Eldredge, Los Altos, Calif., and David B. Jordan, Queens Village, N. Y., assignors to Sylvania Electric Products Inc., a corporation of Massachusetts Application February 9, 1955, Serial No. 487,062

4 Claims. (Cl. 178—26)

This invention relates to communication systems and more particularly to printing telegraph communication systems.

Radio printing telegraph systems generally transmit information by employing the principle of frequency shift keying, wherein two frequencies represent mark and space conditions of a permutation code. The operation of a conventional telegraph printer requires a code whose permutations will provide at least 32 information symbols, and a suitable code affording these permutations has been developed. It is known as the Baudot code, and is now the standard code in use. This code, comprising combinations of mark and space elements taken five at a time, is known as a five element, two position code. However, long distance radio printer communication employing the Baudot code has not been satisfactory under adverse signal conditions. It has been found that noise, fading, or multiple path distortion conditions alter the code pulses so that the receiving printer prints a character other than the proper one.

Multi-element systems have been proposed for reducing the possibility of errors in frequency shift code system by utilizing 6, 7, 8, or 9 pulses per symbol, and including means for indicating errors if any number of units other than a predetermined number is received. However, systems utilizing codes greater than 5 pulses per character require shorter pulses to accommodate standard printing speeds of 60 words per minute, thereby making each code element more susceptible to mutilation from extraneous transient pulses. Therefore, if the pulse time is lengthened by transmitting code signals either at a slower rate or by utilizing a code with fewer elements per character, the possibility of errors resulting from pulse mutilation is greatly reduced.

To be readily adaptable to existing conventional telegraph printers, a printing system utilizing another code must have at least 32 code combinations to represent the 32 printing symbols. The necessary combinations may be expressed as $N^n$, where N is the number of frequency channels or code positions, and $n$ is the number of information pulses per letter. Possible practical combinations are $N=2$, 4, 6, or 32 and $n=5$, 3, 2, or 1, respectively. The time required to transmit information to printers at the rate of approximately 60 words per minute is .163 second per letter, this time being divided into a .132 second period for sending information, and a .031 second period for synchronizing and stop purposes. By reducing the number of pulses per letter and increasing the number of channels, the advantages of longer pulse length may be achieved, while still allowing .132 second as the transmission time per letter.

If a 32 position system is used, the band width is approximately 2.7 times greater than the spectrum occupied by the 2 position system, since the number of channels is increased 16 times although the band width required to pass each pulse has been decreased 83% due to an increase in pulse time by a factor of 6. In some instances the increase in band width required for the 32 position system may not be desirable. On the other hand, a 6 channel plus carrier channel, 2 element code, hereinafter known as a 6 position, 2 element code utilizes no greater band width than the conventional two position system, but has all the additional advantages of a pulse length increased by a factor of 3, as will be shown below.

In the 6 position, 2 element arrangement, the period of .163 second per symbol is divided into two information pulses of .066 second duration, and one carrier frequency pulse of .031 second, which may be used for synchronizing automatic frequency control or stop signal functions. The conventional Baudot two position, 5 element code divides the .163 second into 6 pulse periods of .022 second each, and one stop period of .031 second, the whole period comprising 5 information periods and one start pulse period. Therefore, each .066 second pulse in the 6 position, 2 element code system is 3 times as long as a pulse in the Baudot system, reducing the required pulse band width by a factor of 3. On the other hand, since the number of channel frequencies have been increased by a factor of 3, the resultant band width remains the same as in the Baudot code system. The sextuple system makes efficient use of channel capacity since 36 possible combinations are available, thereby providing the required 32 elements for printer operation, with an additional four extra combinations for other uses as may be desired.

Briefly, in accordance with the present invention, information expressed in terms of the standard 5 element, two position code is translated into a code having no more than two elements per character but having multiple positions, each position being represented by a discrete frequency. Information encoded in the multi-frequency shift system is then transmitted to receiving means where it is re-translated into the Baudot system for conventional printer operation.

It is therefore an object of the invention to provide a printer system for transmitting information at least at the same rate as systems using the Baudot code, but at slower keying speeds.

Another object of the invention is to provide a printer system which greatly reduces signal mutilation.

It is a further object of the invention to provide a telegraph code encoder for translating information expressed in terms of a first telegraph code into information expressed in terms of a second telegraph code, and a translator for translating information expressed in terms of the second code back to information expressed in terms of the first code after reception of the second code signals.

Still another object of the invention is to provide a system for preserving secrecy of communication in which an information code may be quickly and easily changed to another code.

Another object of the invention is to provide a code translating system which may be easily adapted to conventional telegraph printing equipment.

For a better understanding of the invention, together with other and further objects thereof, reference is made to the following detailed description taken in connection with the accompanying drawings in which:

Fig. 5 is a table of the conventional five element

Baudot code and a suggested multi-frequency shift code.

For purposes of illustration, a system embodying a 6 position, 2 element code is described. However, it is understood that the system is not limited to this code, but any other suitable code may be used.

Figure 1:
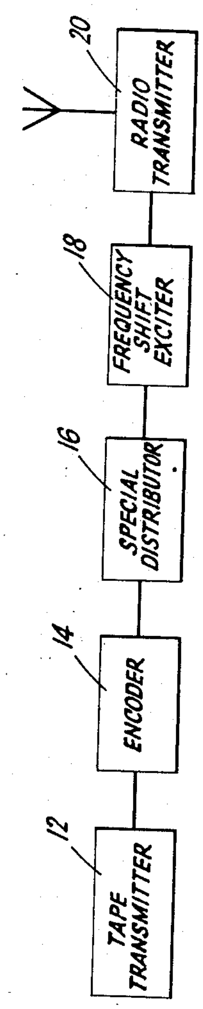
Fig. 1 illustrates diagrammatically the essential elements of a transmitting system arranged in accordance with the invention.

Referring now to the drawings, in Fig. 1 is shown in block schematic, a transmitting system embodying the principles of the invention. A typical system may comprise a conventional tape transmitter 12, more preferably called, for the purposes of this invention, a first code receiver, for converting information stored on tape in the Baudot code into coded information expressed in the form of electrical impulses, an encoder 14 for converting the Baudot code pulses into a six position, two element code, a transmitting switching mechanism or distributor 16 for distributing the pulses from the encoder in proper time sequence; a transducer or frequency shift exciter 18 for shifting the frequency of the transmitter in accordance with the code impressed thereon, and a conventional radio transmitter 20 for amplifying the output voltage of the frequency shift exciter.

Figure 2:
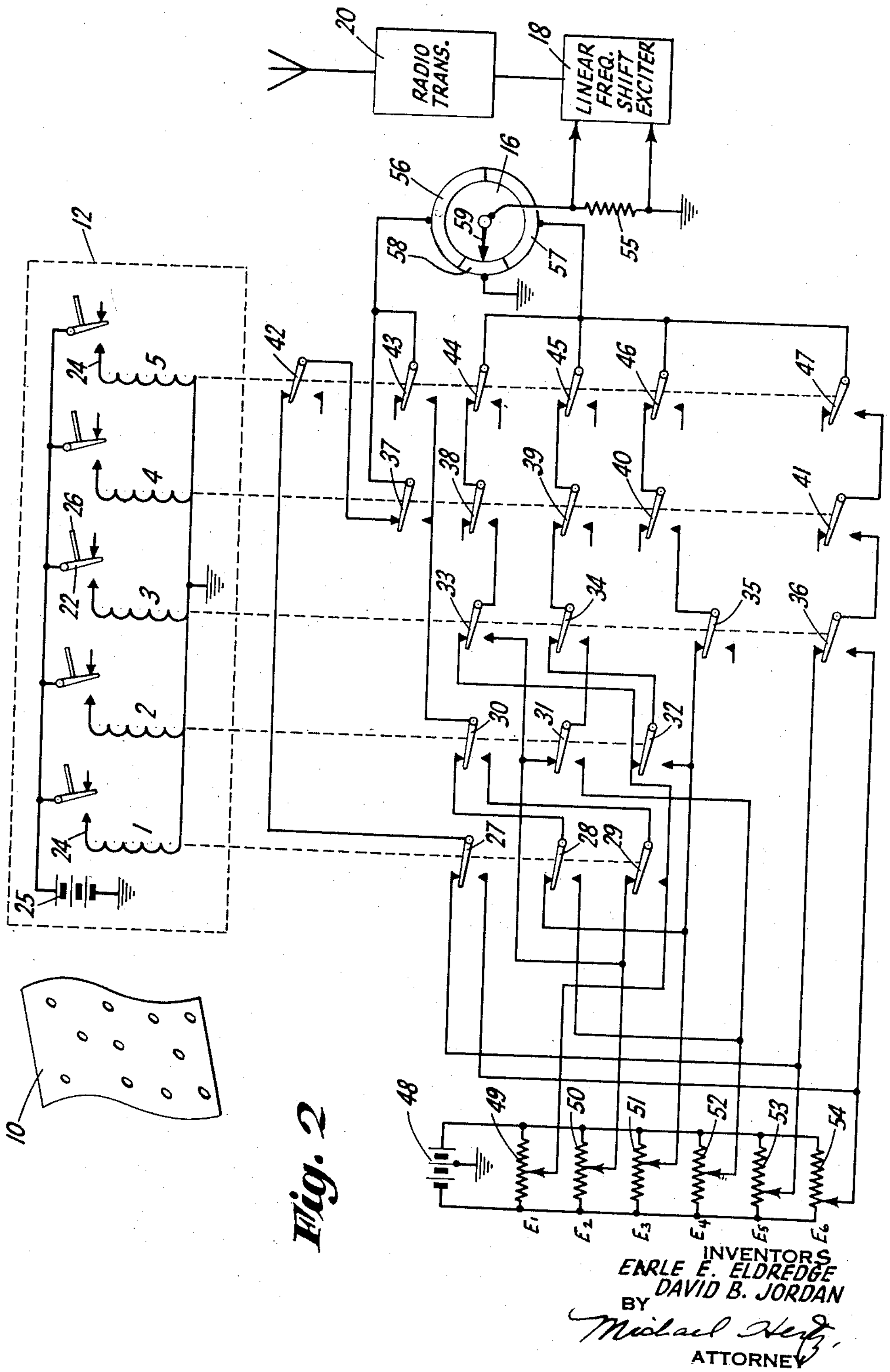
Fig. 2 shows in schematic form an embodiment of the encoding translator.

Referring to Fig. 2, there is disclosed a perforated tape 10 which is fed to sensing pins 26 of a conventional tape transmitter 12. The tape 10 is punched so that perforations therein represent the mark positions of a 5 element, 2 position Baudot code.

The sensing pin in a conventional tape transmitter are connected mechanically to electrical contacts, which may be used in conjunction with a rotary distributor to control an electrical circuit for keying or otherwise. In the present invention, instead of being connected directly to a distributor, the movable contacts 22 of the tape transmitter, which are actuated by sensing pins 26, are each electrically connected to relay magnets 1 to 5. The relay magnets have a common grounded connection to a source of electrical energy, such as a battery 25. Movable contacts 22 are so arranged that when a sensing finger registers with a perforation in tape 10, the associated movable contact engages one of the fixed contacts 24, thereby closing a circuit through battery 25, and energizing one or more of the actuating means or magnets 1 to 5 connected to the particular contacts actuated. Each magnet is provided with a plurality of armatures, shown arranged in alignment therewith and numbered consecutively 27 through 47. Thus, magnet 1 actuates armatures 27 through 29, magnet 2 actuates armatures 30 through 32, magnet 3 actuates armatures 33 through 36, magnet 4 actuates armatures 37 through 41, and magnet 5 operates armatures 42 through 47. Each armature, shown in Fig. 2 in resting position with magnets 1 to 5 de-energized, is provided with a plurality of pairs of contacts for completing selected circuit paths between the sources of frequency shifting voltages 49 through 54 and the transmitter distributor 16.

An energy source 48, represented in Fig. 2 as a battery having a ground connection at its mid point, so that opposite potentials appear between the battery terminals and the ground connection, supplies a voltage for shifting the frequency of linear frequency shift exciter 18 by means of the variable impedances shown as voltage dividers 49 through 54 inclusive. Each voltage divider has an adjustable tap so that the voltage required to cause a desired amount of frequency shift in the output of linear frequency exciter 18 may be accurately adjusted.

Linear frequency shift exciter 18 may be any source of radio frequency energy whose output frequency is capable of being shifted in response to a change in a frequency control voltage. For example, an oscillator having a reactance tube modulator associated therewith whose grid is responsive to the potential at the voltage divider, or any other frequency shifting means known to those skilled in the art may be used.

Distributor 16 may be a conventional transmitting distributor operated at normal transmitting speed, but having a modified commutator. The tape 10 is advanced after each cycle of operation of the commutator, as by a stepping magnet acting on the tape advance means, which magnet is controlled by the distributor driving mechanism, or by the means shown in Robinson 1,661,962. The commutator is divided into three segments, two of which are of equal length. As information is transmitted in the sextuple system by selecting any two of six frequencies, voltages representing two chosen frequencies are each conducted by the encoder 14 into either one of the two equal length commutator segments 56 or 57 which are swept by movable arm 59. Commutator segments 56 and 57 are of such a length that each is swept by movable arm 59 for a .066 second interval. Commutator segment 58, utilized for actuating a stop signal of carrier frequency, has a length such that it may be swept for a .031 second period. Voltages commutated by transmitter distributor 16 are developed across an impedance 55, which controls the linear frequency shift exciter 18. One end of resistor 55 is connected to movable arm 59 and the exciter while the other end is connected to ground.

It is convenient to use commutation information segments having .066 second lengths, with a stop segment of .031 second length, since a conventional transmitting distributor may then easily be adapted to a sextuple system by simply connecting the six .022 second segments to form two groups of three segments, each group thereby having a .066 second length. The remaining .031 second segment may then be utilized for the normal stop control functions. However, if desired, commutator segments may be provided, having three equal lengths of .0543 second, thereby allowing a longer carrier frequency transmission time.

It is desirable in a sextuple system to have the six information frequencies equally displaced about a central or carrier frequency. Therefore, commutator segment 58 is connected to ground so that in a standby position with movable pick-off arm 59 at rest and in contact with segment 58, impedance 55 is shorted out, thereby allowing frequency shift exciter 18 to transmit an unshifted or carrier frequency. By properly adjusting voltage dividers 49 through 54, three positive voltages may be distributed separately by transmitting distributor 16 to exciter 18. If the frequency shift exciter has an output that is directly proportional to changes in the control voltage, a positive voltage will cause a corresponding positive increase in carrier frequency and a negative control voltage will cause a corresponding decrease in carrier output frequency. In order to conserve band width it is desirable to have the seven frequencies spaced as closely together as possible. However, the frequency separation may be as great as desired, and the spacing between frequencies need not necessarily be equal. Any desired frequency shift may be attained by adjusting voltage dividers 49 through 54 correspondingly. The voltage dividers may also be adjusted to compensate for any nonlinear frequency deviation in the frequency shift exciter.

When the sextuple transmitting system is in operation, tape 10, perforated in accordance with the Baudot code, is passed through tape transmitter 12, where sensing fingers 26 register with the perforations in tape 10. All relays 1 through 5, having sensing fingers 26 which contact the perforations in tape 10, will be energized, thereby causing their associated group of armatures 27 to 47 to assume new positions. In this manner, the conventional tape transmitter 12 becomes a receiver for the Baudot code signals. These armatures are interconnected in such a manner that any combination of five elements representing a symbol expressed in the Baudot code will be translated into another particular combination of six elements expressed in the sextuple code. Voltages $E_1$ through $E_6$ appearing at the adjustable taps of voltage dividers 49 through 54 are applied by means of selected groups of armatures 27 through 47 and associated interconnections, to either one of commutator segments 56 or 57. The armatures 27 through 47 and their respective contacts are so connected that only one of the six voltages $E_1$ through $E_6$ is applied at any one time to either segment 56 or 57.

Each of the selected voltages is applied by means of movable arm 59 of the transmitting distributor 16 to the input impedance 55 of linear frequency shift exciter 18, thereby causing the exciter to shift frequency in accordance with the magnitude of the applied voltage. The output of the linear frequency shift exciter 18 is then applied to a conventional radio transmitter 20.

As the voltages $E_1$ through $E_6$ are determined by setting the adjustable taps on voltage dividers 49 through 54, any particular pair of the voltages $E_1$ through $E_6$ representing a symbol expressed in the sextuple code may be chosen arbitrarily. Furthermore, the code may be changed at will by merely changing the values of $E_1$ through $E_6$ at frequent intervals, thus secrecy of communications is preserved by a table comparing the standard Baudot code with an arbitrarily chosen sextuple code as shown in Fig. 5. It should be understood that the sextuple code as shown in Fig. 5 is for purposes of illustration only, and that any one of 36 possible combinations of six elements representing a symbol may be chosen for the sextuple code.

Translation by the encoder from the Baudot code to the sextuple code occurs as follows. By way of illustration, assume that the letter R has been presented to the tape transmitter 12 by means of a tape perforated in accordance with the proper elements of the Baudot code. According to the Baudot code table shown in Fig. 5 perforations representing mark positions will be punched in tape marking positions 2 and 4. Sensing fingers 26 will then engage perforations 2 and 4 in tape 10, causing magnets 2 and 4 to become energized by mechanically closing their respective contacts 22 and 24. Armatures 30, 31, 32 and armatures 37, 38, 39, 40, and 41 will be pulled downwardly. Tracing the circuit path from $E_2$, the circuit comprises the up contact of armature 29, through armature 29 to the down contact of armature 30, through armature 30 to the down contact of armature 37, through armature 37 to commutator segment 56 of transmitting distributor 16, through the movable arm 59 to resistor 55, through resistor 55 to ground, through a ground return path to the grounded center tap of the source of energy 48. Armatures 30 and 37 are in a down position due to the active coils 2 and 4. $E_1$ is similarly connected to commutator segment 57 through the contact of armature 32, to the up contact of armature 33, through armature 33 to the down contact of armature 38, through armature 38 which is now in a down position due to the action of coil 4, to the up contact of armature 44, through armature 44 to commutator segment 57, through movable arm 59 to input impedance 55, and through a ground to the source of energy 48. By following the sextuple codes shown in Fig. 5, the circuit paths for every other symbol may be similarly traced.

Figure 3:
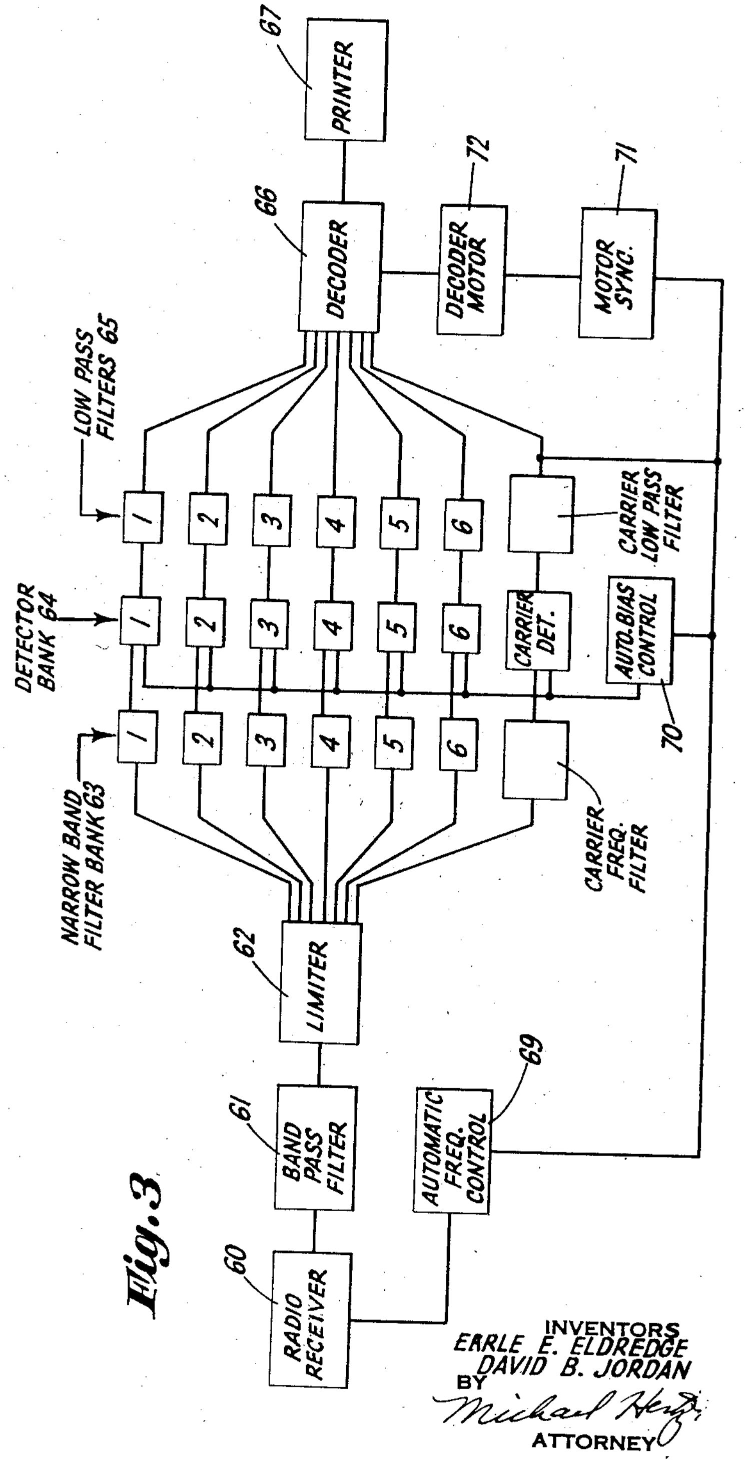
Fig. 3 represents diagrammatically the essential elements of a receiving system arranged in accordance with the invention.

In Fig. 3 is shown in block schematic a receiving system embodying the principles of the invention. For purposes of illustration, a system for receiving and translating sextuple systems will be described. In general, the system comprises a conventional radio receiver 60 for converting incoming multi-frequency shift signals emitted by transmitter 20 at radio frequencies into signals having audio frequency values. Although subsequent detection of a signal may be accomplished at the intermediate frequency stage of receiver 60, it is preferable to first convert the signals to audio frequencies in the radio receiver in order to take maximum advantage of the ease with which filtering may be done at an audio frequency. The audio output of receiver 60 is fed to filter 61 which may be a conventional audio band pass type filter.

To facilitate the use of high Q filters, the incoming multi-frequency shift signals may be converted to frequencies between 1,000 and 4,000 cycles. In order to conserve band width it is desirable to have the various frequencies spaced as closely together as possible. For example, a sextuple system may be designed so that the output of frequency shift exciter 18 is shifted as little as 4% for each discrete frequency. If 2,000 cycles were designated as carrier frequency, then upon conversion by radio receiver 60, audio frequencies representing the sextuple code would then be 1778, 1849, 1923, 2080, 2163, 2250 cycles, respectively. By utilizing such closely spaced frequencies, band pass filter 61 may have a pass band between 1700 and 2350 cycles, thereby improving the system's ability to reject signals lying outside the pass band.

The output of band pass filter 61 is fed into limiting stage 62 in order to prevent strong signals from overloading subsequent stages of the system. Limiter 62 may be a conventional limiting circuit having one or two stages with 20 to 40 db of limiting. The output of limiter 62 is received by filter bank 63, having 7 narrow band audio filters of conventional design for separating both the six information signals and the carrier signal from each other. Each separated signal is then fed to its own detector 64 where it is converted into a substantially square wave pulse having a length equal to the duration of the received signal, which, in the case of a sextuple system, would result in a .066 second pulse. Each detector may be a conventional diode type detector or a discriminator circuit may be used if desired. The output of each of the seven detectors is terminated by an individual low pass filter, all seven low pass filters being represented by reference numeral 65.

Low pass filters 65 serve to aid additionally in preventing noise or unwanted signals to be printed. In order that essentially square waves will be received by the decoder unit, it is desirable that the low pass filters 65 have pass bands sufficient to pass at least the third harmonic of an input signal. In the case of a sextuple system, a filter with a cutoff frequency as low as 45 cycles may be used. The outputs of the seven low pass filters 65 are connected to decoder unit 66 which, by suitable relay means re-translates the six position, two element code into the Baudot code for operation of a conventional telegraph printer 67. The operation of the decoder will be described in more detail below.

Since each encoded symbol has a carrier frequency pulse of .031 second duration, this pulse may be utilized for various system control functions. A portion of the output voltage of the carrier frequency low pass filter 65 may be applied to an automatic frequency control circuit 69. Any conventional type of automatic frequency control system such as a reactance tube controlled A. F. C. circuit may be used to stabilize the converter oscillators of radio receiver 60 to insure that proper frequencies are received by the narrow band filter 63 at all times. The carrier pulse may also be amplified and suitably filtered by automatic bias control 70 in order to provide an automatic bias voltage for all seven of detectors 64. Further reduction in printing errors may be obtained if detectors 64 are properly biased so that only signals of amplitude equal to, or greater than the incoming multifrequency shift signals are detected. Automatic bias control 70 may be a conventional A. V. C. type of circuit with suitable filters for providing a slowly varying D.-C. voltage to detectors 64. By proper adjustment of the biasing voltage, detectors 64 may be made relatively immune to extraneous noise.

The carrier pulse voltage may also be used as a control voltage for motor synchronization purposes. For proper operation of the decoder 66, it is necessary that synchronous decoder motor 71 be maintained in synchronism with transmitter distributor 16. A conventional motor synchronizing circuit 71 may be used for this purpose by obtaining its controlling voltage from the output of carrier low pass filter 65.

Figure 4:
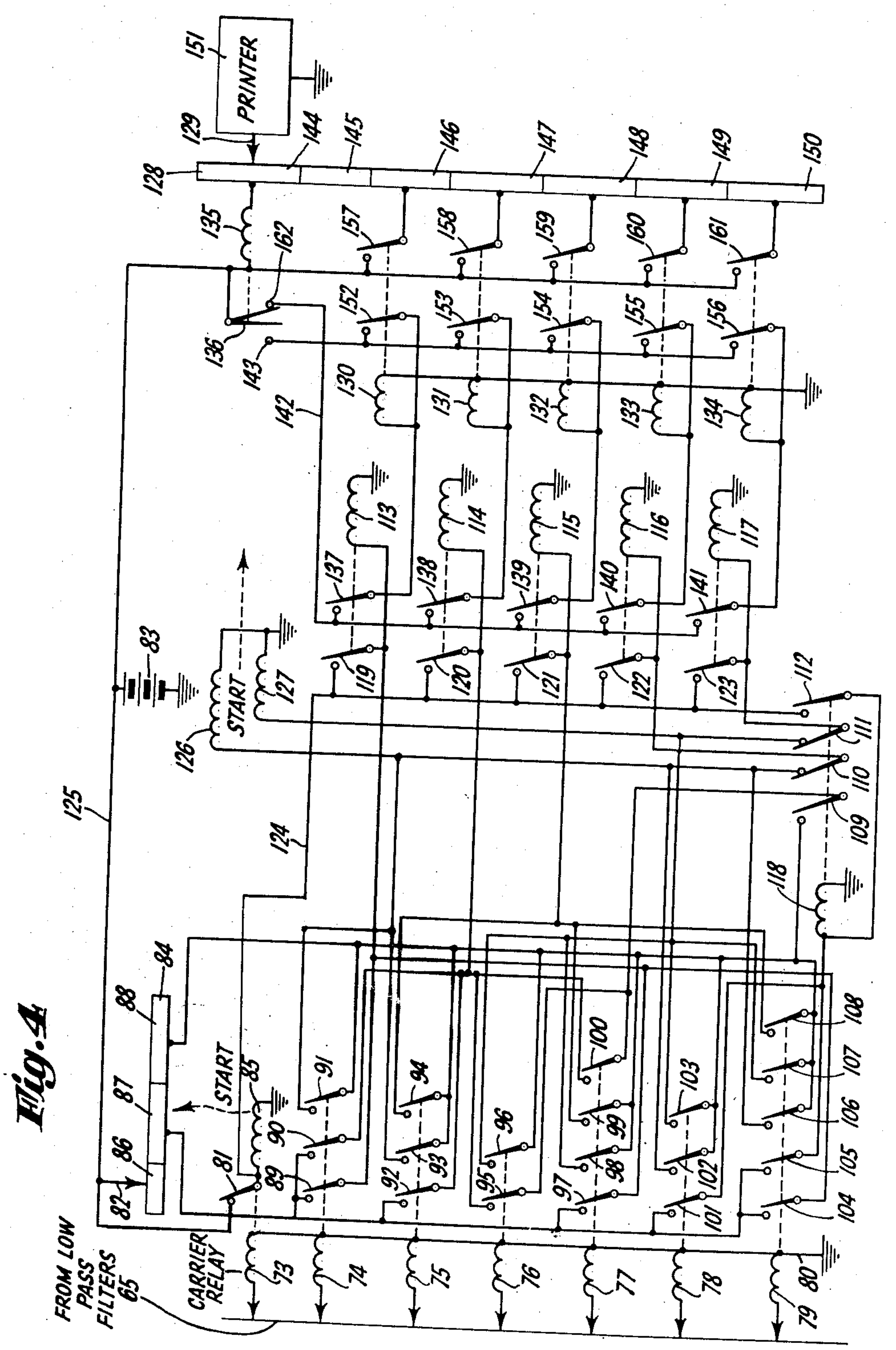
Fig. 4 shows in schematic form an embodiment of the decoding translator.

The circuit schematic of a suitable decoder for retranslating sextuple encoded information into elements of the Baudot code is shown in Fig. 4. The seven low pass filters 65 are terminated by carrier relay 73 and six translating relays 74 through 79 respectively. These relays and filters constitute the incoming signal selective device. A stage of amplification for amplifying the essentially D.-C. pulses from the output of the low pass filters may be inserted between each filter output and relays 73 through 79 if desired. A conventional electron tube amplifier preferably one having direct coupling to the output of the low pass filters may be used for this purpose. Relays 73 through 79 have a common connection 80 to serve as a return path to low pass filters 65. Carrier relay 73 has a switch with a normally closed contact 81, one terminal of which is connected to the movable arm or rotary wiping contact or current collector 82 of receiving distributor 84, and to a source of energy 83 represented in Fig. 4 as a battery. The other terminal of the battery is connected to ground. The movable terminal of contact 81 is connected to one side of start relay 85, and the other terminal of this relay is connected to ground. The movable terminal of contact 81 is also connected to the fixed terminal of contacts 119 through 123 and also to the fixed terminal of contact 112. Distributor 84 has three commutator segments 86, 87, and 88. This distributor is identical with transmitting distributor 16 in that distributor 84 has one segment of .031 second length and two active segments 87 and 88 of .066 second length provided the segments are swept by movable arm 82 at the proper speed. Distributor 84 serves as a means for connecting or transmitting pulses through the decoder 66 in accordance with the incoming signals. Connected to distributor segment 87 are the fixed contact terminals 89, 90, 92, 97, 101, 104, and 105 of a group of character identification operated switches. One terminal of relay magnet 113 is connected to the movable armatures of contacts 89, 97 and 104. One terminal of relay magnet 114 is connected to movable armatures of contacts 90 and 92, and fixed terminal 95 of another such switch and fixed terminal 100.

By means of these connections, storage relays 113 or 114 may be energized through a circuit path from energy source 83 to movable arm 82, through segment 87 to any one of the above mentioned contacts connected thereto, when movable arm 82 of receiving distributor 84 engages segment 87, provided one or more of the channel relays 74 through 79 have been energized by means of a received signal.

Relay magnet 115 has one terminal connected to fixed terminals of contacts 94, 99, and 108. Relay magnet 116 has one terminal connected through normally closed contact 110 to fixed terminals of contacts 91, 93, 102 and 106. Relay magnet 117 has one terminal connected through normally closed contact 111 to fixed terminals of contacts 96, 98, 103 and 107. The distributor segment 88 is connected to the movable armatures of contacts 91, 93, 94, 96, 98, 99, 102, 103, 106, 107, 108, and fixed contact 109. By means of these various contacts, which are actuated by relays 74 through 79, magnets of storage relays 115, 116, and 117 will be actuated when movable arm 82 of receiving distributor 84 engages commutator segment 88, thereby allowing voltage from voltage source 83 to be applied to said magnets, provided one or more of channel relays 74 through 79 have been actuated by an incoming signal.

Connected to the movable armatures of contacts 101 and 105 is relay magnet 118, having contacts 109 to 112 associated therewith. As contacts 110 and 111 are normally closed, energizing relay magnet 118 through connections to contacts 101 and 105 will prevent relay magnets 116 and 117 from being energized when movable arm 82 engages commutator segment 87, provided channel relays 78 and 79 have been actuated. It is necessary in some instances, in order to secure proper selection of all possible combinations, that storage relays 116 and 117 be deenergized when commutator segment 87 has a voltage applied thereto.

Relay magnets 113, 114, 115, 116, 117, and 118 have self locking circuits including contacts 119 through 123, respectively, and 112, connected to line 124 and to source of energy 83 through normally closed contact 81 and line 125. By means of this circuit, information stored by relays 113 through 117 is held for later distribution.

Connected to distributor segment 88 through the movable armatures of contacts 91, 93, 102, and 106 is magnet 126, which serves to energize starting means for the second receiver or distributor 128. Also connected through the fixed terminals of contacts 96, 98, 103, and 107 is magnet 127, which also serves to energize starting means for the second receiver or second distributor 128.

Information encoded in terms of the sextuple code is thus translated through channel relays 74 through 79 into information encoded in terms of the Baudot code, and stored in relays 113 through 117. As the movable arm 129 of receiving distributor 128 is not actuated by start magnets 126 or 127 until movable arm 82 on receiving distributor 84 has engaged commutator segment 88, wiping contact 129 will be approximately .097 second behind wiping contact 82 of receiving distributor 84. It therefore becomes necessary to transfer the information stored in relays 113 through 117 to another or secondary set of storage means in order to allow relays 113 through 117 to be free to receive fresh information from relays 74 through 79 when wiping contact 82 engages commutator segment 87. Relays 130 through 134 provide a second set of storing or self-holding means for information encoded in the Baudot code. Relays 130 through 134 have one terminal of their magnets connected respectively to movable armatures of contacts 137 through 141. The other end of relays 130 through 134 have a common ground return connection. When any or all of relays 113 through 117 have been energized, their associated contacts 137 through 141 will close, thereby causing relays 130 through 134 associated therewith to be actuated, provided the armature of contact 136, which is associated with relay magnet 135 has remained closed, so that lead 142 is connected to source of energy 83. As movable armature 136 of relay 135 is normally held against terminal 143 by relay magnet 135, since the magnet has a ground return to source of energy 83 through commutator segment 144, movable arm 129 and printer 151, energizing either start relay 126 or 127 will cause wiping arm 129 to start rotating, thereby opening the circuit connecting 135 to source of energy 83 when the arm moves away from commutator segment 144 and allowing the movable armature of contact 136 to engage terminal 162. A holding circuit for the second storage relays 130 through 134 is provided by means of contacts 152 through 156 respectively. When the rotating wiping arm 82 of the first receiving distributor 84 has completely traversed the length of commutator segment 88, it returns to engage commutator segment 86. At the same time carrier relay 73 will be energized, causing contact 81 to open and thereby releasing the holding circuit of the first storage magnets 113 through 117, as the source of energy for these magnets is connected through line 125, contact 81, and contacts 119 through 123, respectively. As the movable armature of contact or transfer device 136 is held against terminal 162 when relay magnet 135 is energized, relays 113 through 117 by means of their respective contacts 137 through 144 will cause second storage relays 130 through 134 to be energized and actuate contacts 152 through 156 respectively, before wiping arm 129 has begun to rotate. When arm 129 has passed beyond segment 144, movable arm 136 will engage contact 143 as relay magnet 135 becomes deenergized, thereby causing the hold circuit to function through those contacts 152 through 156, which were previously closed by certain of relays 113 through 117. The connection of movable contact 136 with fixed contact 162 is not broken until after the connection is made with contact 143. Thus the information stored by relays 130 through 134 is held until movable wiping contact 129 again engages commutator segment 144, causing relay 135 to be reenergized and to disconnect the hold circuit connected to contact 143. Coded information stored by relays 130 to 134 is transferred to distributor 128 by causing source of voltage 83 to be applied to receiving distributor segments 146 through 150. The voltage will be applied to those segments which have been connected to source 83 through whatever particular relay contacts 157 through 161 that may have been energized by second storage relay magnets 130 through 134. The relays 113 through 117 and 130 through 134 and their associated movable contacts or armatures comprise a signal storage device for the decoder.

Since transmission of the letter R was used by way of illustration to show the operation of the sextuple encoder, this character will be used to illustrate the operation of the decoder. In this manner, the cycle of encoding a Baudot code into a sextuple code and subsequently receiving and decoding it back into the Baudot code for indication on a conventional printer will have been completed.

As shown in Fig. 5, the letter R was transmitted as symbol 21 in the sextuple code. This symbol identified the transmission of the frequencies created by the sequential imposition of voltages $E_2$ and $E_1$ upon the linear frequency shift exciter 18. Upon reception of these two signals by receiver 60, they are passed through band pass filter 61, limiter 62, and subsequently through their corresponding narrow band filters 63, detectors 64, and low pass filters 65. For the transmitted sextuple code symbol 21 corresponding to the letter R, the filter banks 63 and 65, and detectors 64 identified as 2 and 1 would be utilized. These two incoming signals then, have been channeled to actuate relays 75 and 74 in that sequence.

Prior to transmission of the signals corresponding to the letter R, the carrier frequency was being received and channeled through its corresponding filters 63 and 65, and detector 64 to cause the carrier relay 73 to be energized. This relay holds the contact 81 in the open position. The only closed circuit in the decoder system while the carrier frequency is being received connects supply 83 with relay 135, through commutator segment 144 of the second receiving distributor 128, wiping arm 129, the printer or character forming device 151 and ground. Energization of relay 135 causes the movable arm of contact 136 to engage terminal 162.

When the frequency shift occurs, the incoming signal actuates channel relay 75 causing contacts 92, 93, and 94 to close. At the same time, the carrier relay 73 has been deenergized, thereby allowing contact 81 to close. The start relay 85 then becomes energized and the wiper arm 82 of distributor 84 moves into contact with commutator segment 87. Relay 114 is thereby energized by a completion of the circuit from the source of supply 83 to wiper arm 82, through segment 87 to contact 92, and thence to relay 114 and ground. Upon energization of relay 114, contacts 120 and 138 close. Since the movable contact 136 is at position 162, the holding relay 131 becomes energized through D.-C. supply 83, contact 162, and contact 138 to ground. The current flow through holding relay 131 actuates movable contacts 153 and 158. Therefore, the first frequency signal which was channeled into relay 75 becomes available at commutator segment 147 of the standard 7 segment Teletype commutator 128.

The second frequency signal which completes identification of the letter R being transmitted, is available at channel relay 74 at the time wiping arm 82 comes in contact with commutator segment 88. Upon energization of relay 74, contacts 89, 90 and 91 are closed. The wiping arm 82 completes a circuit from D.-C. supply 83 through segment 88, contact 91, contact 110, to relay 116 and ground. Energization of this relay closes contacts 122 and 140. The closing of contact 140 connects holding relay 133 with the D.-C. supply through contact 162. This holding relay 133 causes contacts 155 and 160 to close. Therefore, the second signal which completes identification of the letter R becomes available at commutator segment 149 of the standard Teletype commutator 128.

In addition to the completion of a circuit through relay 116 when the wiping arm 82 is in contact with commutator segment 88 and contact 91 is in a closed position, the starting relay 126 for the standard Teletype commutator 128 also becomes energized, starting the wiping arm 129 in motion. As soon as this wiping arm moves off commutator segment 144, the circuit energizing relay 135 is broken, and armature 136 connects with contact 143. However, the connection with contact 143 as stated before, is made before contact with 162 is broken. Therefore, both holding relays 131 and 133 are still energized through contacts 153 and 155, respectively, and connected with the D.-C. supply 83 by way of contact 143. This holding circuit provides for maintaining the connections to commutator segments 147 and 149 while the wiper arm 82 of commutator 84, which is leading wiper arm 129 of commutator 128 by .097 second, moves back to commutator segment 86 prior to receiving the next character signals. As the wiper arm 129 moves over the commutator segments, it transmits the information from the commutator segments 147 and 149 to the conventional printer 151 wherein this information is identified as the letter R.

As the wiper arm 82 of commutator 84 moves into contact with segment 86, contact 81 opens, thus clearing relays 113 through 117 in preparation for reception of the next character.

While this invention has described and illustrated a sextuple code system for transmission at approximately 60 words per minute, it is to be understood that the system is not limited to this code or transmission speed. Those skilled in the art will understand that other codes and transmission speeds may be adapted and other changes and modifications may be made without departing from the scope and spirit of the invention.

What is claimed as new is:

1. In a translator, means for translating a first code character information in which there are always a like number of signals per character with variations in the signals to a second code character information in which there are a larger combination of signals per character with a lesser number of variations in the signals, said translator comprising a plurality of input channels each selectively sensitive to a different variation of the signals of the first code and having a signal responsive switch, a number of relays each connected to different selected ones of said switches, a first distributor having a number of conductive segments corresponding to at least the number of signals required to form a character in the first code, each of said segments being connected to a contact of a plurality of said switches, a second distributor having a plurality of electrically-isolated segments, the number of isolated segments corresponding, at least, to the number of signals required to form a character of the second code, a source of potential, means under control of each of the conductive segments of the first distributor for connecting said source for a pulse interval to a selected group of said switches, any of which may have been closed in response to an incoming first code signal, storage means connected between each of said relays and a segment of said second distributor, certain of said relays being responsive to the operation of said switches upon the application of potential thereto through one of said conductive first distributor segments to apply a potential through said storage means to certain of the isolated segments of the second distributor, others of said relays being responsive to the operation of said switches upon subsequent applications of potential to successive segments of the first distributor to apply a potential to others of the isolated segments of the second distributor, and means for reading out the potentials on the second distributor segments.

2. In a translator, means for translating a first code character information in which there are always a like number of signals per character with variations in the signals to a second code character information in which there are a larger combination of signals per character with a lesser number of variations in the signal, said first code information having character identification signals and also a carrier signal associated therewith, said translator comprising a carrier signal input channel and a plurality of character identification input channels, each having an output switch, one of said switches being operable by the carrier signal, the other switches being operable by the character identification signals, storage relays connected to selected switches, said relays including a primary set of self-holding storage relays and a secondary set of self-holding storage relays, with connections between contacts of the first set of relays with magnets of the second set, a source of potential, a first distributor having a number of conductive segments corresponding at least to the number of signals required to form a character of the first code, a first start mechanism associated with said distributor and operable through the carrier signal switch, a second distributor having isolated segments corresponding at least to the number of signals required to form a character of the second code, a second start mechanism associated with the second distributor and under control of the last conducting segment of the first distributor, means under control of each of the segments of the first distributor for connecting said source of potential to a selected group of said other switches, certain of said primary set of self-holding storage relays being responsive to the position of the character identification operated switches upon application of the potential thereto through a conductive distributor segment, certain ones of said primary set of self-holding relays being responsive to the position of character identification operated switches upon subsequent application of potential through a succeeding segment of the first distributor, means to switch said potential source through contacts of the primary set of the self-holding relays to the secondary set of self-holding relays, said switching means acting under the influence of the second start mechanism to permit de-energization of said primary relays while maintaining the energization of said secondary relays, means associated with the said secondary relays for connecting said source of potential to certain of the isolated segments of said second distributor and means operable by the second start mechanism for reading out the potential on the second distributor segments, for de-energizing the secondary relays and for preparing the circuits for the energization of the first set of self-holding relays.

3. A translating system for converting a first representation of a character by successive pulses of frequency variable signals to a second representation by a multi-position simultaneous signal code, comprising: a plurality of signal conductive channels, each selectively sensitive to one of said signal frequencies; a plurality of multi-contact switching devices, each controllable by a signal in a separate one of said channels; means for activating different combinations of said contacts for different pulse periods of said first representation; a signal storage device corresponding to each position of said second representation; a combination of conductors and switching relays connected between said multi-contact switching devices and said signal storage devices in a network corresponding to the relationship between said first and second representations; and, means for sensing said storage devices to derive signals therefrom.

4. For a radio teletypewriter system a decoder for converting a pulsed radio frequency code representation of a character to a multi-position signal code representation of the same character, wherein each R. F. pulse is constituted by a single radio frequency from a given group of frequencies available for all the pulses, comprising: a plurality of signal conductive channels each selectively tuned to one of said available frequencies, each channel terminating in a signal operated switching relay; a first distributor having a separate conductive segment corresponding to each pulse in said frequency code; a plurality of first storage relays, one for each position of said multi-position code; a separate plurality of switches operated by each of said switching relays each of said switches being connected in circuit between one of said segments and one or more of said first storage relays; a source of potential cyclically connected, in cycles corresponding to said R. F. pulse intervals, to each of said segments; said switches being so connected between said segments and said first storage relays and said first distributor being so synchronized with said R. F. pulses that a signal derived from an R. F. pulse and operating one of said switching relays results in a connection between said source of potential and one or more of said relays thereby converting the R. F. pulse to a positional signal code representation; a separate second storage relay corresponding to and operated by each of said first storage relays; switching means arranged to provide holding current to said second relays and deenergize said first relays after a first pulse of a character representation has been converted to a multi-positional signal code by said relay operated switches connected to said first relays and stored in said second relays, thereby preparing said first storage relays for conversion of the next pulse; a second distributor having a separate segment for each position of said multi-position code; switching means connecting each one of said second storage relays to a corresponding one of said segments of said second distributor; and means, controlled by the final pulse of said R. F. code for reading-out the character coded upon the segments of said second distributor.

References Cited in the file of this patent

UNITED STATES PATENTS

| | | |
|---|---|---|
| 1,399,997 | Rainey | Dec. 13, 1921 |
| 1,661,962 | Robinson | Mar. 6, 1928 |
| 2,132,213 | Locke | Oct. 4, 1938 |
| 2,117,804 | Hicks | May 17, 1938 |
| 2,134,118 | Foss | Oct. 25, 1938 |